Jan. 16, 1962 G. F. STRAND 3,016,911
FLUID OPERATED PRIME MOVERS

Filed April 7, 1959 2 Sheets-Sheet 1

INVENTOR
GEORGE F. STRAND

BY
Watson, Cole, Grindle & Watson
ATTORNEYS

Jan. 16, 1962 G. F. STRAND 3,016,911
FLUID OPERATED PRIME MOVERS
Filed April 7, 1959 2 Sheets-Sheet 2

INVENTOR
GEORGE F. STRAND
BY
Watson, Cole, Grindle & Watson
ATTORNEY

United States Patent Office 3,016,911
Patented Jan. 16, 1962

3,016,911
FLUID OPERATED PRIME MOVERS
George Frederick Strand, Gloucester, England, assignor to Rotol Limited, Gloucester, England, a company of Great Britain
Filed Apr. 7, 1959, Ser. No. 804,836
Claims priority, application Great Britain Apr. 11, 1958
5 Claims. (Cl. 137—33)

This invention relates to fluid operated prime movers examples of which are turbines and positive displacement motors such as swash plate motors operating either with compressible or incompressible fluids.

An object of the present invention is to provide governing means for such a prime mover which is simple and compact.

A fluid operated prime mover, according to the present invention, includes a motor having a shaft arranged to be turned by the fluid, and a centrifugally controlled valve in the flow path of motive fluid driving the motor comprising two co-operating parts relative movement between which is arranged to control the rate of flow of motive fluid through the motor, both the said parts and their centrifugal control means being mounted to rotate with the shaft.

Preferably the two parts of the valve are arranged to move relatively to one another about the axis of rotation of the shaft and include co-operating rings of ports.

Preferably the first part of the valve is fixed rigidly to the shaft and the second part is connected to the shaft by a spring and carries an abutment, and the centrifugal control means comprises a flyweight which contacts the abutment and which is mounted on the shaft by a pivot whose axis is displaced from that of the shaft, movement of the flyweight resulting from rotation of the shaft tending to rotate the second part of the valve relative to the first part against the bias of the spring to vary the rate of flow of motive fluid through the valve.

Thus the spring may be given an initial bias which will be balanced by the centrifugal force acting on the flyweight when the shaft is rotating at a predetermined speed and the flyweight will then move the two parts of the valve relatively to one another and will reduce the rate of flow of fluid through the valve when the speed of rotation exceeds a predetermined value. The governing thus tends to maintain a constant speed of rotation of the motor.

In one construction according to the invention the first part of the valve comprises a sleeve coaxial with the shaft and having ports in its periphery and the second part of the valve comprises a cylindrical barrel carried within the sleeve and having ports which co-operate with those in the sleeve, relative rotation of the barrel and the sleeve tending to increase or reduce the area of flow through the ports.

Preferably the sleeve contains two axially spaced rings of ports the first communicating with an annular inlet manifold in a housing surrounding the valve to which fluid under pressure may be admitted and the second ring communicating with an annular outlet manifold in the housing which is in communication with the motor, the ports in the barrel connecting the ports of the first ring to those of the second ring.

This arrangement produces balancing of the axial forces acting on the two parts due to the flow of fluid through the ports. Furthermore the ports in each ring and the ports in the barrel may be disposed so that each port has a corresponding port symmetrically disposed on the opposite side of the axis of the shaft thus producing balancing of the radial forces due to the flow of fluid through the ports.

In a second arrangement according to the invention the first part of the valve includes a radial face in which is disposed at least one port and the second part of the valve includes a radial face closely adjacent the radial face of the first part and having disposed therein a port or ports co-operating with the port or ports in the face of the first part, relative rotation of the two parts tending to increase or reduce the area of flow through the ports.

Preferably, the second arrangement includes second radial faces in the first and second parts of the valve facing respectively in the opposite axial directions to those of the first radial faces and containing co-operating rings of ports the flow through which provides an axial balance to the flow through the ports in the first radial faces. In order to balance the radial forces acting on the parts of the valve due to flow of fluid through the ports there may be more than one corresponding pair of ports in the first part and second part and for each pair of ports there may be a corresponding pair of ports symmetrically disposed on the opposite side of the axis of the shaft.

The preferred spring is a torsion coil spring one end of which may be connected to the shaft by means of a clamping mechanism comprising a securing sleeve screwed on to the shaft and to which the said end of the spring is secured and a clamping bolt which threads into an axial bore in the shaft and whose head bears against a shoulder on the securing sleeve the threads on the securing sleeve and the clamping bolt being of opposite hand such that the bias of the spring will tend to rotate the securing sleeve and the clamping bolt in a direction to drive the head and shoulder together. This arrangement provides an infinitely variable adjustment by which the initial torsion of the spring may be determined and, since the threads on the sleeve and the clamping bolt are of opposite hand, any tendency of the spring to rotate the securing sleeve will result in even tighter clamping.

The motor may comprise a turbine whose blades are mounted on the first part of the valve.

The invention may be performed in various ways and a bleed air turbine embodying the invention together with a modification thereof will now be described by way of example, with reference to the accompanying drawings, in which.

Figure 1:
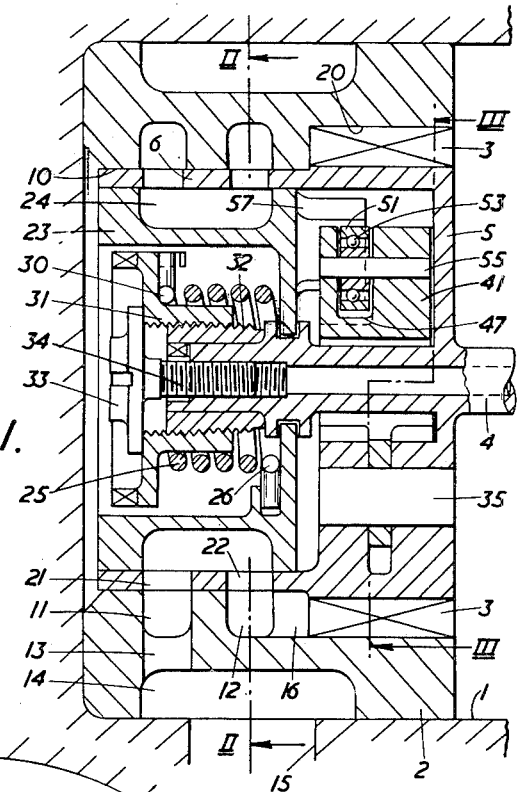
FIGURE 1 is an axial longitudinal section of the turbine.
Figure 2:
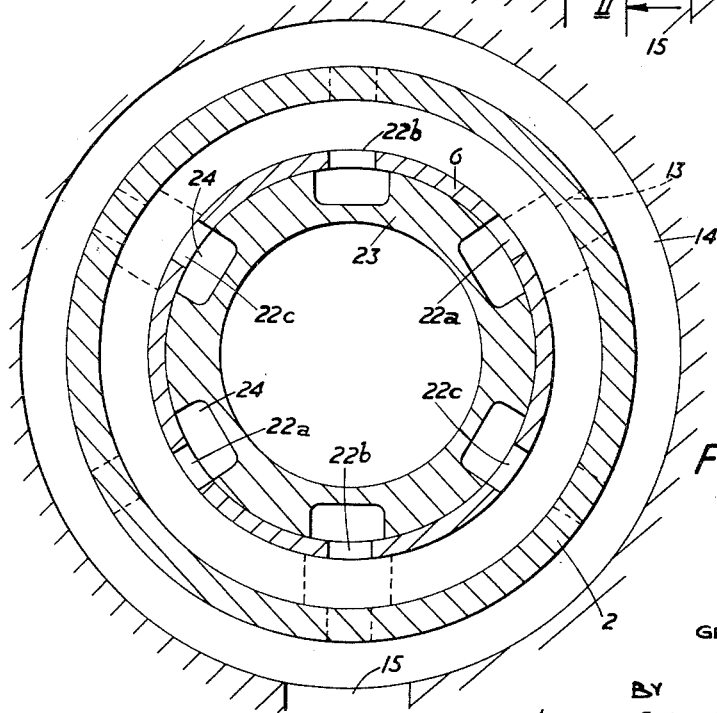
FIGURE 2 is a transverse section of the turbine taken on the line II—II of FIGURE 1.
Figure 3:
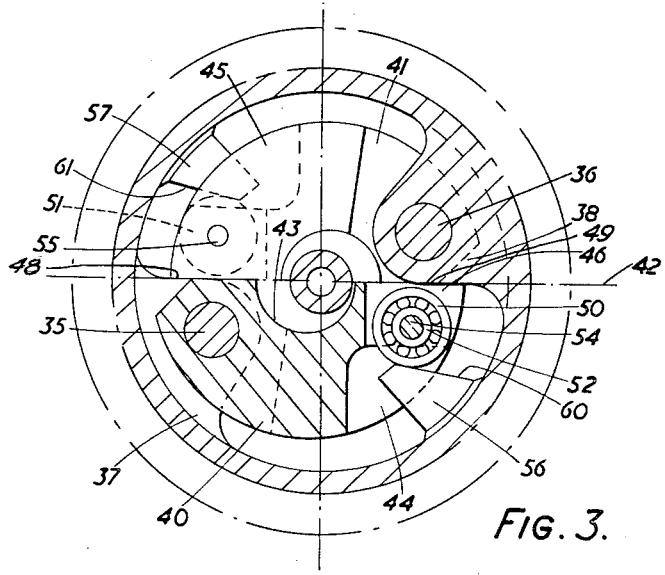
FIGURE 3 is a transverse section through the centrifugal control means of the turbine taken on the line III—III of FIGURE 1 with the turbine blades omitted.

The turbine shown in FIGURES 1 to 3 of the drawings is mounted in an outer casing 1 and comprises a housing 2 which is carried within the casing 1 and constitutes the stator of the turbine and a rotor which carries a ring of turbine blades 3 and is mounted on a shaft 4 within the housing 2. The turbine is driven by compressed air bled from a compressor (not shown) and the shaft 4 may drive various pieces of equipment.

The rotor comprises a radially extending circular flange 5 from the outer edge of which a cylindrical sleeve 6 extends to beyond the end of the shaft 4. The turbine blades 3 are secured to the outer sufrace of the sleeve 6 adjacent the flange 5.

The sleeve 6 is contained in a bore 10 in the housing 2 in which it is a running fit.

The inner surface of the bore contains a pair of axially spaced annular manifold passages 11, 12 which are open to the surface of the sleeve 6 on their inner radial faces. The manifold passage 11 nearest the free end of the sleeve is connected through a number of radial passageways 13 in the housing to an annular gallery 14 in the housing which is connected to the source of compressed air through a duct 15 in the outer casing 1. The other manifold passage 12 is connected by a series of axial passageways 16 to the turbine blade ring 3 which is housed in an annular recess 20 in the housing. The axial passageways 16 thus constitute the inlet nozzles to the turbine.

Circumferentially spaced around the sleeve 6 is a ring of inlet ports 21 which extends radially through the sleeve and open at their outer ends into the inlet manifold passage 11 and a similar ring of circumferentially spaced outlet ports 22 extending through the sleeve 6 the outer ends of which open into the outlet manifold passage 12 and which are axially aligned with those of the inlet ports 21.

Coaxial with the sleeve 6 and within it is a barrel 23 whose outer diameter is such that the barrel is able to rotate within the sleeve 6 but makes a close fit with it.

The outer surface of the barrel contains a number of circumferentially spaced axially directed grooves 24 whose circumferential spacing (as will be seen from FIGURE 2) corresponds to that of the ports 21, 22 in the sleeve 6 and whose length extends between the two rings of ports, the grooves thus being able to connect the inlet ports 21 and outlet ports 22 in the sleeve when the barrel 23 is in a suitable position of angular adjustment about the axis relative to the sleeve. Relative rotation of the barrel 23 and the sleeve 6, however, will result in the grooves 24 passing out of register with the inlet ports 21 and the outlet ports 22 thus reducing the possible flow through them.

In order to increase the range of relative rotation between the position when all ports are fully open and the position when all ports are fully closed the pairs of ports in the barrel and in the sleeve are not all arranged in the same relationship to each other, though to maintain balancing each pair of ports has an exactly corresponding pair of ports diametrically opposite to it. Thus in the position shown in FIGURE 2 as soon as there is rotation of the barrel 23 clockwise relative to the sleeve the two ports marked 22a will begin to close. On further rotation the ports marked 22b will begin to close and only after considerable rotation will the ports 22c begin to close. The gradual reduction of area of the flow passage through the ports will continue until all the ports are closed.

The barrel 23 is connected to the end of the shaft 4 by means of a torsion coil spring 25, coaxial with the shaft and surrounding it, fixed at one end 26 to the barrel and connected to the other end 30 to the shaft. The end 30 of the coil spring is attached to a securing sleeve 31 which is threaded on to an exterior threaded portion 32 on the end of the shaft. The securing sleeve 31 may therefore be rotated relatively to the shaft 4 to stress the torsion spring 25. The sleeve 31 is held from rotation when the desired stress has been imparted by means of a clamping bolt 33 the shank 34 of which screws into an internal thread in an axial bore in the end of the shaft 4 and the head of which bears against the end of securing sleeve 31. The threads on the bolt 33 and on the securing sleeve 31 are of opposite hand selected so that, once the bolt is clamped up against the securing sleeve, the bias of the spring will tend to rotate the securing sleeve and the bolt in a direction which will merely tend to increase the clamping effect.

As best shown in FIGURE 3 the flange 5 on the shaft carries bosses 37, 38 which carry a pair of pivot pins 35, 36 which extend from the flange towards the end of the shaft. The pins are disposed symmetrically about the axis of the shaft and slightly more than half way between the axis and the interior surface of the sleeve.

Pivoted on each of the pivot pins is a flyweight 40, 41 of substantially semi-circular cross section in a plane at right angles to the axis of the shaft 4 with its diameter, when the shaft is at rest, lying on a line (the line 42 in FIGURE 3) running through the axis of the shaft, each pivot pin passing through the respective flyweight towards a corner of the semi-circle and the central part of the flyweight being cut away at 43 to allow it to partially surround the shaft. In this position of rest the diametral edge of each of the flyweights on the side of the shaft remote from the respective pivots bears against the radial face 48 of the bosses 37, 38. Partway round the circumferential edge of each flyweight from the corner remote from the pivot pin is a deep notch 44, 45 and the end of each of the flyweights remote from the respective pivot has a deep groove 46, 47 cut in it in a direction perpendicular to the axis of the pivot so that the flyweight, in effect, is forked. Between the forks of each of the flyweights is a roller 50, 51 mounted by a ball-bearing 52, 53 on the axle 54, 55 which is secured at each end of the forks of the flyweight and whose axis is parallel with the axis of the pivot pin 35, 36. The circumferences of the rollers extend into the respective notches 44, 45 and the barrel 23 carries on its radial face adjacent the flyweight a pair of abutments 56, 57 which extend into the notches in the flyweights and contact the rollers 50, 51 carried by them. The faces 60, 61 of the abutments contacting the rollers 50, 51 are so formed that movement of the flyweights 40, 41 about their pivots outwardly from the axis of the shaft rotates the barrel 23.

The valve and governor thus comprise a closed system which rotates as a whole with the shaft 4. The system constitutes the following parts: the shaft 4, the radial flange 5 attached to the shaft and carrying the sleeve 6 of the valve, the flyweights 40, 41 which are pivoted to the flange 5, the abutments 56, 57 on the barrel 23 which bear against the rollers 50, 51 on the flyweights and tend to press the flyweights against the radial faces 48, 49, the barrel 23 and the coil spring 25 which connects the barrel 23 to the shaft 4.

Operation of the turbine is as follows: Compressed air is admitted through the duct 15 to the annular gallery 14 from which it passes through the radial passageways 13 to the inlet manifold passage 11. The compressed air then passes through the inlet ports 21 in the sleeve 6 into the grooves 24 formed in the barrel 23. The air leaves the grooves 24 in the barrel through the outlet ports 22 in the sleeve and passes from the outlet manifold passage 12 through the nozzles 16 in the housing 2 and through the turbine blade ring 3 thus causing rotation of the shaft 4 and with it the various parts of the valve mechanism. The rotation of the shaft will result in centrifugal force tending to move the flyweights 40, 41 outwardly from the axis of the shaft and the resulting load will be transferred from the flyweights through the rollers 50, 51 to the abutments 56, 57 attached to the barrel 23, thus tending to rotate the barrel relatively to the shaft against the torsion of the coil spring 25. When the force produced by the flyweights exceeds any initial torsion contained in the spring the barrel will rotate relatively to the shaft and hence relatively to the sleeve 6. The grooves 24 in the barrel will become out of register with the ports 21, 22 in the sleeve and the flow through these ports will be reduced. Thus the flow of fluid to the turbine blades 3 will be reduced and the speed of the shaft will fall until the grooves and ports are again in register. There is thus a governing action which tends to maintain the speed of rotation of the shaft constant.

Figure 4:
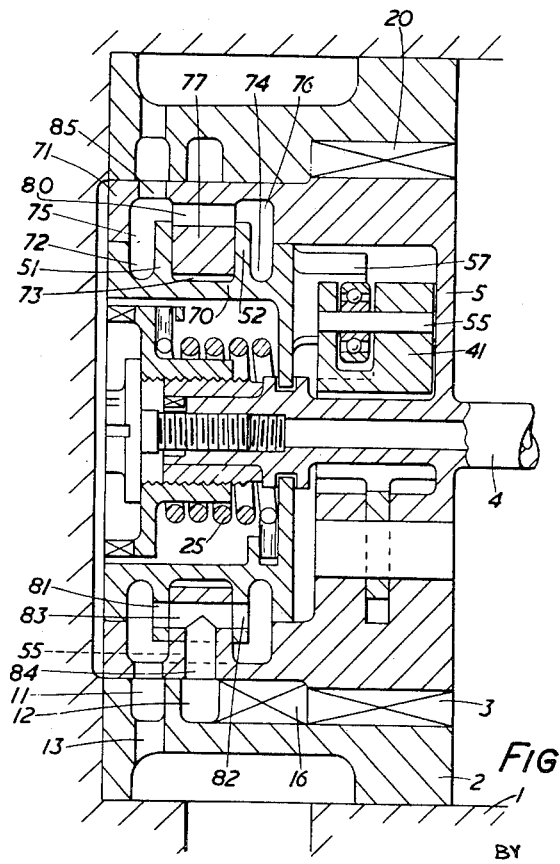
FIGURE 4 is an axial longitudinal section of a modified turbine, the view corresponding to that of FIGURE 1.

FIGURE 4 illustrates a modified turbine the general construction of which is similar to that described with reference to FIGURES 1 to 3, and in which like ports have been given like reference numerals. Thus the constructions of the outer casing 1, the housing 2 which contains the inlet and outlet manifold passages 11, 12, the nozzle ring 16 and the recess 20 in which the turbine blades 3 move are similar to those previously described.

The constructions and arrangement of the centrifugal control means comprising the flyweights 40, 41, the abutments 56, 57 and the torsion spring 25 are also similar to those previously described, the main differences being in the arrangement of the ports in the barrel 70 and the sleeve 71. In the previous embodiment the flow of fluid between the barrel and the sleeve was radial but in the modified turbine it is axial.

The barrel 70 has in its surface three axially spaced circumferential grooves 72, 73, 74 the outer two of these grooves corresponding with two grooves 75, 76 formed in the interior surface of the sleeve and the central groove 73 containing an inwardly directed radial flange 77 formed on the sleeve. The two grooves 75, 76 in the sleeve are permanently connected by a series of circumferentially spaced axially extending passages 80 through the flange 77. The groove 75 in the sleeve remote from the flange 5 on the shaft 4 is connected by radial holes 85 through the sleeve 71 to the inlet manifold passage 11 in the housing 2 and thus forms an inlet plenum; since it is connected to the other groove 76 in the sleeve by the passages 80 through the flange this other groove also forms an inlet plenum. Each of the walls between the outer grooves 72, 74 and the central groove 73 in the barrel 70 contains a series of circumferentially spaced axially directed ports 81, 82 and the inwardly directed flange 77 on the sleeve contains a corresponding series of circumferentially spaced axially directed outlet passages 83 which, when they are in register, connect the ports 81, 82 in the walls between the grooves in the barrel. The pitch radius of these axial outlet passages 83 is smaller than those 80 previously described for connecting the grooves 75, 76 in the sleeve. Each of these axial outlet passages 83 in the flange forms the head of a T-shaped passage whereof the stem is formed by a radial passage leading to the outer surface of the sleeve 71 and opening into the outlet manifold passage 12 formed in the housing.

The flow of fluid is thus as follows: It passes from the inlet manifold passage 11 through the radial holes 85 in the sleeve 71 into the annular inlet plenums formed by the pairs of grooves 72, 75 and 74, 76. It then passes through the ports 81, 82 in the walls between the grooves in the barrel into the axial outlet passages 83 in the flange 77 whence it passes through the radial passages 84 into the outlet manifold passage 12 in the housing 2. From here it passes through the nozzles 16 into the turbine blade ring 3. Governing is effected in the same ways as in the first embodiment since relative rotation of the barrel 70 and the sleeve 71 will tend to move the ports 81, 82 in the walls between the grooves in the barrel out of register with the axial outlet passages 83 in the flange 77 of the sleeve 71 and thus restrict the flow to the turbine. Relative rotation of the barrel 70 and the sleeve 71 will be produced when the speed of rotation of the shaft 4 rises above a certain value by the action of the flyweights 40, 41 on the abutments 56, 57 on the barrel 70 as was described above in connection with the first embodiment.

Instead of the flow of fluid from either of the two valve mechanisms described being passed through a nozzle ring 16 and used to operate a turbine 3 it may be used to drive a positive displacement motor such as, for example, that described in British Patent No. 730,560 granted to British Messier Limited.

In both constructions described the dispositions of the governor flyweights and their geometry are such that high external inertia loadings upon the mechanisms in any direction will have only a very small adverse effect upon the controlling characteristics of the governor system.

What I claim as my invention and desire to secure by Letters Patent is:

1. A fluid-operated prime mover including a motor having a shaft arranged to be turned by the fluid, a valve housing having a bore coaxial with the shaft and having in its interior surface a circumferential fluid inlet gallery and a circumferential fluid outlet gallery spaced from the inlet gallery, a valve in the bore for controlling the flow of fluid through the motor, and comprising an outer sleeve coaxial with the shaft, and having two sets of ports extending through it, and co-operating respectively with the inlet and outlet galleries, and an inner sleeve coaxial with the shaft and having means for connecting the sets of ports in the outer sleeve, the inner sleeve and outer sleeve being positively connected by a torsion coil spring coaxial with the shaft and located within the inner sleeve, one of the sleeves being rigidly connected to the shaft and the other of the sleeves carrying an abutment, and centrifugal control means comprising a flyweight which contacts the abutment, and is mounted on the shaft by a pivot having an axis which is displaced from the axis of the shaft.

2. A prime mover as claimed in claim 1 in which the means for connecting the sets of ports in the outer sleeve comprise a plurality of axially extending recesses in the outer surface of the inner sleeve.

3. A prime mover as claimed in claim 1 in which the inner sleeve carries a pair of circumferential ribs projecting outwards and affording opposed plane annular surfaces, and the outer sleeve carries a circumferential rib projecting inwards between the said surfaces and having corresponding surfaces face to face with them, the rib having in it T-shaped passages communicating with one of the galleries and affording ports in its annular surfaces co-operating with ports in the surfaces of the ribs of the inner sleeve, and passages connecting the latter ports to the other gallery.

4. A prime mover as claimed in claim 2 in which said torsion coil spring has two ends and said shaft has an axial internally threaded bore and including a clamping mechanism comprising a securing sleeve having an internal thread which is screwed on to said shaft and having a shoulder, one end of said spring being secured to said clamping mechanism, and a clamping bolt having a head and a shank with an external thread, said shank threading into said axial internally threaded bore and said head bears against said shoulder, and said internal thread and said external thread being of opposite hand.

5. A prime mover as claimed in claim 3 in which said torsion coil spring has two ends and said shaft has an axial internally threaded bore and including a clamping mechanism comprising a securing sleeve having an internal thread which is screwed on to said shaft and having a shoulder, one end of said spring being secured to said clamping mechanism, and a clamping bolt having a head and a shank with an external thread, said shank threading into said axial internally threaded bore and said head bears against said shoulder, and said internal thread and said external thread being of opposite hand.

References Cited in the file of this patent

UNITED STATES PATENTS

| | | |
|---|---|---|
| 627,700 | Menier | June 27, 1899 |
| 838,725 | Larkin | Dec. 18, 1906 |
| 1,729,030 | Cook | Sept. 24, 1929 |
| 1,759,641 | Cook | May 20, 1930 |
| 2,598,439 | Reger | May 27, 1952 |
| 2,667,345 | Dale | Jan. 26, 1954 |
| 2,698,021 | Bricker | Dec. 28, 1954 |
| 2,714,517 | Powell | Aug. 2, 1955 |
| 2,767,735 | Darling | Oct. 23, 1956 |
| 2,887,119 | Lee | May 19, 1959 |